May 8, 1923.  1,454,704
W. N. COLEMAN, JR
CUTTER AND GUARD FOR MOWERS
Filed Dec. 15, 1921
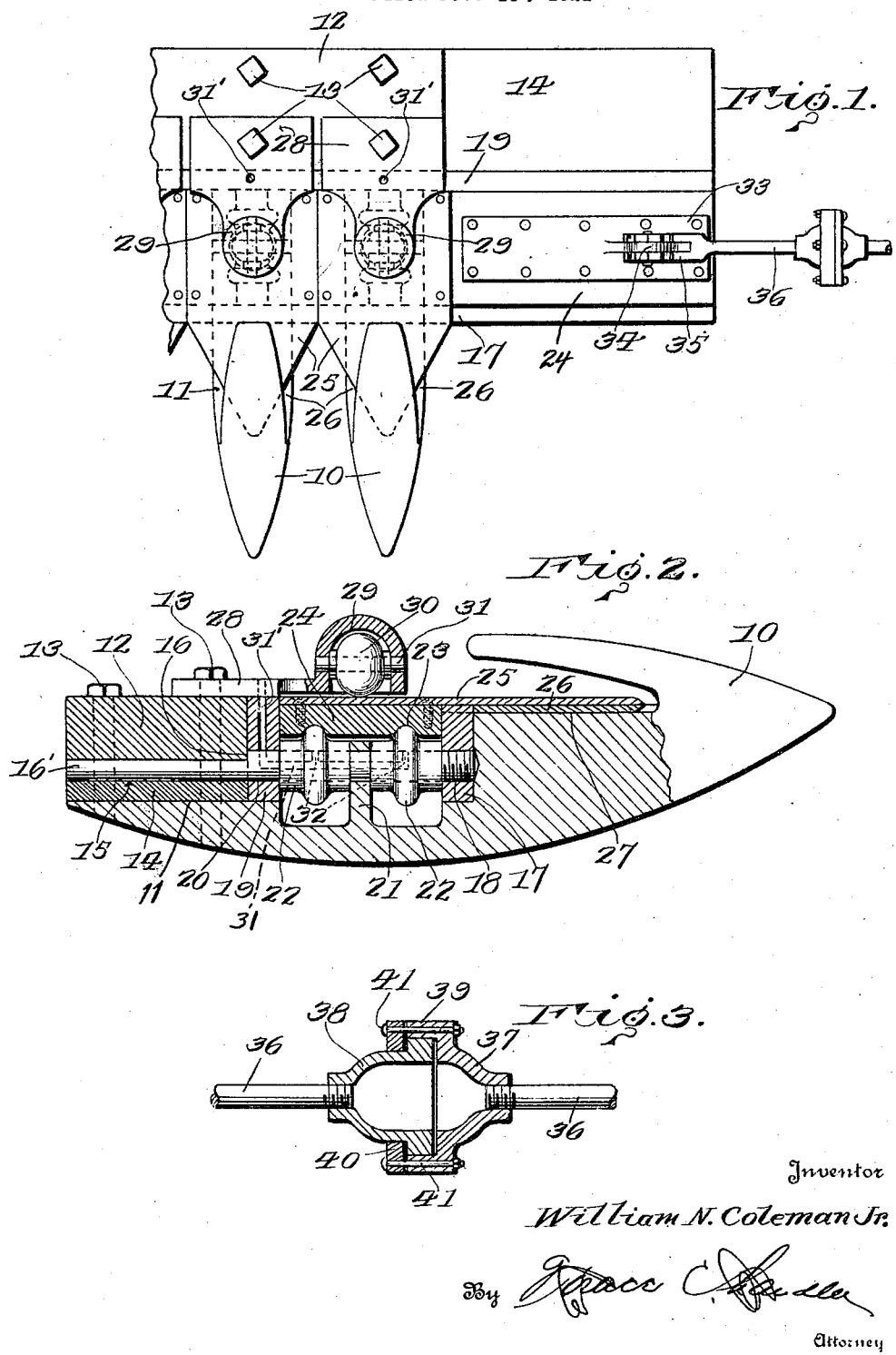

Patented May 8, 1923.

1,454,704

UNITED STATES PATENT OFFICE.

WILLIAM N. COLEMAN, JR., OF CULVERTON, GEORGIA.

CUTTER AND GUARD FOR MOWERS.

Application filed December 15, 1921. Serial No. 522,535.

*To all whom it may concern:*

Be it known that I, WILLIAM N. COLEMAN, Jr., a citizen of the United States, residing at Culverton, in the county of Hancock, State of Georgia, have invented certain new and useful Improvements in Cutters and Guards for Mowers; and I do hereby declare the following to be a full, clear, and exact description of the invention, such as will enable others skilled in the art to which it appertains to make and use the same.

This invention relates to new and useful improvements in mowing machines and particularly to the cutting apparatuses therefor.

One object of the invention is to provide a device of this character whereby the friction between the stationary and movable cutting elements is reduced to a minimum.

Another object is to provide a cutting apparatus of this character which can be easily and quickly lubricated, and which is capable of easy and quick repair.

Other objects and advantages will be apparent from the following description when taken in connection with the accompanying drawing.

In the drawing:

Figure 1 is a top plan view of a portion of a mower cutting apparatus made in accordance with the invention.

Figure 2 is a sectional view taken longitudinally through one of the teeth and transversely of the cutter bar, the upper and lower rollers being shown in elevation, enlarged.

Figure 3 is an enlarged vertical sectional view through the coupling of the pitman rod.

Referring particularly to the accompanying drawing, 10 represents one of the guard fingers of the cutting apparatus of a mowing machine the inner or rear end of which is rabbeted at 11 to receive the finger bar 12, to which the finger is secured by means of the vertical bolts 13. A plate 14 is also seated in the rabbet and has a plurality of transverse concave recesses 15 formed in its upper face for the reception of the rear ends of the series of shafts 16, to which reference will be made later herein.

In the forward portion of the rabbet 11 there is secured a vertical plate or bar 17 having a plurality of threaded openings 18 therein, that is an opening for each guard finger 10. Disposed in the rabbet, against the front edge of the bar 12 there is disposed another plate or bar 19, similar to the bar 17 and having a similar number of openings 20. Disposed through these openings 20, and having their front ends threaded into the openings 18, are the before-mentioned shafts 16. Formed integrally with the bottom wall of the rabbet, and rising at a point intermediate the plates 17 and 19, is a wall 21 through which the shaft 16 also passes. Rotatable on each shaft 16, between the wall 21 and the respective bars 17 and 19, are the peripherally ribbed rollers 22. Resting on the upper surfaces of these rollers 22, and having the longitudinal grooves 23 in its bottom face, is a bar 24 which has secured to its upper face the plurality of cutting teeth or blades 25, said blades cooperating with the blades 26, which are secured in the forward recesses 27 of the guard fingers. Secured to the upper face of the bar 12, and extending forwardly over the upper edge of the bar 17, and over the upper knife blades 25, is a plurality of arms 28, the forward ends of which are formed with the upwardly arched sockets 29 in each of which is disposed a roller 30, mounted on a shaft 31. The lower faces of the rollers 30 rest on the upper faces of the blades 25 and exert downward pressure to maintain the ribs of the rollers 22 within the grooves of the bar 24.

Formed longitudinally through the center of each of the shafts 16 is an oil passage 31, the inner end of which extends vertically through the bar 19, as shown at 31', and upwardly through the upper face thereof, while intermediate vertical branches 32 extend to the centers of the rollers 22.

With a construction as thus described, the movement of the bar 24 is rendered easy and smooth, and without friction, the bar running on the rollers 22, while the rollers 30 maintain the bar in proper alinement, so that the blades 25 are maintained in proper cutting relation to the blades 26.

The rear end of the shaft 16 is cut away in its upper portion, as shown at 16', and in said cut away portion the bar 12 is seated so that the shaft will be prevented from turning.

Secured to one end of the upper face of the bar 24 is a plate 33, said plate having a vertical apertured lug 34. Straddling this lug 34, and pivotally connected thereto, is the forked end 35 of the pitman rod 36. This rod 36 is provided with a detachable coupling which comprises a pair of hollow cup members 37 and 38, the former being formed with a circumferential flange 39 within which the larger end of the cup 38 fits, a flat ring 40 being disposed against the flanged ends of the members 37 and 38, and bolts 41 passed through the ring and the flange of the cup 37. The sections of the rod 36 are screwed into the smaller ends of the cups, respectively, as shown in detail in Figure 3.

While I have shown a construction wherein there is an arm 28 for each of the guard fingers 10, I wish it understood that the number may be changed to suit the conditions and the desires of the operator. The preferred manner is to provide four or five of the arms for each cutter length of four or four and one-half feet.

What is claimed is:

In a cutting mechanism for mowers, a guard finger having a rabbet in its rear portion, a support for the finger secured within the rear portion of the rabbet, a vertical bar secured in the forward end of the rabbet, a second vertical bar secured in the rabbet rearwardly of the first vertical bar, a plate secured in the rabbet beneath the support and having transversely extending recesses, a shaft disposed in one of the recesses and through one of the said vertical bars and secured within the other vertical bar, a support for the shaft between the said bars, a peripherally ribbed roller on the shaft between the last-named support and each vertical bar, a slidable bar having its lower face grooved to receive the ribs of the rollers, and a roller supported above and engaging with the slidable bar.

In testimony whereof, I affix my signature, in the presence of two witnesses.

WILLIAM N. COLEMAN, Jr.

Witnesses:
T. L. REESE,
J. A. WOOD.